(12) United States Patent
Mori et al.

(10) Patent No.: US 6,875,335 B2
(45) Date of Patent: Apr. 5, 2005

(54) ELECTROLYTIC MACHINING METHOD AND APPARATUS

(75) Inventors: Yuzo Mori, 8-16-19, Kisaichi, Katano-shi, Osaka (JP); Mitsuhiko Shirakashi, Kanagawa-ken (JP); Takayuki Saito, Kanagawa-ken (JP); Yasushi Toma, Osaka (JP); Akira Fukunaga, Kanagawa-ken (JP); Itsuki Kobata, Osaka (JP)

(73) Assignees: Yuzo Mori, Osaka (JP); Ebara Corporation, Tokyo (JP)

( * ) Notice: Subject to any disclaimer, the term of this patent is extended or adjusted under 35 U.S.C. 154(b) by 0 days.

(21) Appl. No.: 10/449,515

(22) Filed: Jun. 2, 2003

(65) Prior Publication Data

US 2003/0230493 A1 Dec. 18, 2003

Related U.S. Application Data

(62) Division of application No. 09/996,674, filed on Nov. 30, 2001, now Pat. No. 6,602,396, which is a division of application No. 09/645,405, filed on Aug. 25, 2000, now Pat. No. 6,368,493.

(30) Foreign Application Priority Data

Aug. 27, 1999 (JP) ............................................ 11-241869

(51) Int. Cl.$^7$ ........................... B23H 3/00; C25B 15/00; C25B 9/00; C25B 13/00; C25D 17/00
(52) U.S. Cl. ....................... 205/652; 204/239; 204/262; 204/263; 204/224 M
(58) Field of Search ............................. 204/224 M, 282, 204/239, 262, 263, 275.1; 205/672, 652

(56) References Cited

U.S. PATENT DOCUMENTS 5,685,971 A * 11/1997 Schroder et al. ............ 205/642
6,368,493 B1  4/2002 Mori et al. ................. 205/672

FOREIGN PATENT DOCUMENTS

| EP | 1 139 400 | 10/2001 |
|----|-----------|---------|
| JP | 10-58236 | 3/1998 |
| JP | 10-58236 | * 5/1998 |
| JP | 2000-52235 | 2/2000 |
| JP | 2000-167714 | * 6/2000 |

* cited by examiner

Primary Examiner—Patrick Ryan
Assistant Examiner—Thomas H. Parsons
(74) Attorney, Agent, or Firm—Wenderoth, Lind & Ponack, L.L.P.

(57) ABSTRACT

An anode as a workpiece, and a cathode opposed to the anode with a predetermined spacing are placed in ultrapure water. A catalytic material promoting dissociation of the ultrapure water and having water permeability is disposed between the workpiece and the cathode. A flow of the ultrapure water is formed inside the catalytic material, with a voltage being applied between the workpiece and the cathode, to decompose water molecules in the ultrapure water into hydrogen ions and hydroxide ions, and supply the resulting hydroxide ions to a surface of the workpiece, thereby performing removal processing of or oxide film formation on the workpiece through a chemical dissolution reaction or an oxidation reaction mediated by the hydroxide ions. Thus, clean processing can be performed by use of hydroxide ions in ultrapure water, with no impurities left behind on the processed surface of the workpiece.

42 Claims, 8 Drawing Sheets

ELECTROLYTIC MACHINING METHOD AND APPARATUS

This is a divisional application of Ser. No. 09/996,674, filed Nov. 30, 2001, now U.S. Pat. No. 6,602,396 which is a divisional application of Ser. No. 09/645,405, filed Aug. 25, 2000, now U.S. Pat. No. 6,368,493.

BACKGROUND OF THE INVENTION

1. Field of the Invention

This invention relates to a machining method using hydroxide ions in ultrapure water. More particularly, the invention relates to an electrolytic machining method and an electrolytic machining apparatus which use only ultrapure water as an electrolytic solution and increase its ion product markedly, thus being capable of removal processing a workpiece or forming an oxide film thereon by the action of hydroxide ions.

2. Description of the Related Art

In recent years, new materials have been developed one after another with the progress of science and technology. However, effective processing techniques for these new materials have not been established, and constant pursuit after forerunning new materials under development has been encouraged. Recently, microstructure and high precision have been introduced into components of every instrument. As fabrication on the submicron scale has become common, processing methods themselves have exerted increasing influence on the characteristics of materials. Under these circumstances, a processing method in which a tool effects removal processing of a workpiece while physically destroying it, such as conventional machining, causes many defects to the workpiece. As a result, the characteristics of the workpiece are deteriorated. How to process a material without impairing its characteristics poses a problem.

Among special processing methods initially developed as means for solving the problem are chemical polishing, electrolytic machining, and electrolytic polishing. These processing methods, as contrasted with conventional physical processing, carry out removal processing by causing a chemical dissolution reaction. Hence, defects due to plastic deformation, such as affected layers or dislocations, do not occur, and the above-mentioned challenge of processing a material without impairing its characteristics can be solved.

More attention has been paid to a processing method which makes use of a chemical interaction between atoms. This is a processing method utilizing fine particles or a radical with high chemical reactivity. Such a processing method performs removal processing through a chemical reaction, on the atomic order, with a workpiece. Thus, it is capable of processing control on the atomic order. Examples of this processing method are EEM (elastic emission machining) and plasma CVM (chemical vaporization machining) which were developed by the inventor of the present invention. EEM utilizes a chemical reaction between fine particles and workpiece, and realizes processing on the atomic order, without impairing the characteristics of the material. Plasma CVM utilizes a radical reaction between radicals generated in atmospheric plasma and workpiece, and realizes processing on the atomic order.

With the aforementioned electrolytic machining or electrolytic polishing, processing has hitherto been said to proceed by the electrochemical interaction between the workpiece and an electrolytic solution (an aqueous solution of NaCl, $NaNO_3$, HF, HCl, $HNO_3$ or NaOH). As long as the electrolytic solution is used, contamination of the workpiece with the electrolytic solution is unavoidable.

The inventor estimated that in a neutral or alkaline electrolytic solution, hydroxide ions ($OH^-$) must take part in processing, and speculated that processing would be possible with water containing traces of hydroxide ions. Experimentally, the inventor confirmed the possibility for such processing. Based on the findings, the inventor proposed in Japanese Unexamined Patent Publication No. 58236/1998 a method which uses only ultrapure water except for traces of incidental impurities, and applies thereto a hydroxide ion increasing treatment for increasing its ion product. According to this method, a workpiece immersed in ultrapure water having an increased concentration of hydroxide ions is subjected to a chemical dissolution reaction or an oxidation reaction with hydroxide ions, whereby removal processing or oxide film formation takes place. As the hydroxide ion increasing treatment, the inventor also proposed the use of an electrochemical reaction occurring on a solid surface having an ion exchange function or a catalytic function. These proposals have led to the creation of a novel processing method capable of clean processing, with no impurities left behind on the processed surface, by utilizing hydroxide ions in ultrapure water. This processing method is expected to have wide varieties of applications, including the production of semiconductors.

However, it is a well known fact that the concentration of hydroxide ions in ultrapure water is very low and about $10^{-7}$ mol/l at 25° C. and 1 atmosphere. Even with the use of a conventional ion exchange membrane, the hydroxide ion density increased thereby is at most about $10^3$- to $10^4$-fold. This value is $1/10^4$ to $1/10^3$ of the ion density of 1N NaOH. It would make the processing speed still too low to realize practical processing.

SUMMARY OF THE INVENTION

In light of the foregoing circumstances, the present invention aims to provide a processing method capable of performing clean processing, with no impurities left behind on a processed surface of a workpiece, with the use of hydroxide ions in ultrapure water, which method further increases an oxide ion density on a processed surface of a workpiece, and also rapidly removes atoms of the workpiece, bound to the hydroxide ions, from the processed surface, thereby raising the processing speed.

A first aspect of the invention, for attaining the above-mentioned object, is an electrolytic machining method comprising placing an anode and a cathode in ultrapure water, the anode serving as a workpiece, and the cathode being opposed to the anode with a predetermined spacing; disposing a catalytic material between the workpiece and the cathode, the catalytic material promoting dissociation of the ultrapure water and having water permeability; and forming a flow of the ultrapure water inside the catalytic material while applying a voltage between the workpiece and the cathode, to decompose water molecules in the ultrapure water into hydrogen ions and hydroxide ions, and supply the resulting hydroxide ions to a surface of the workpiece, thereby performing removal processing of or oxide film formation on the workpiece through a chemical dissolution reaction or an oxidation reaction mediated by the hydroxide ions.

FIG. 1 shows the principle of processing according to the invention. In ultrapure water, a workpiece 2 as an anode, and a cathode 1 opposed thereto are placed. Between the workpiece 2 and the cathode 1, a nonwoven fabric 3 having ion exchange ability as a catalytic material is disposed. A power source 4 is connected to the workpiece 2 and the cathode 1, and water molecules, a, in the ultrapure water are decomposed into hydroxide ions, b, and hydrogen ions, c, by the ion exchange material 3. The resulting hydroxide ions, b, are supplied to a surface of the workpiece by an electric field working between the workpiece 2 and the cathode 1 and by a flow of the ultrapure water to increase the density of the hydroxide ions near the workpiece and react the hydroxide ions, b, with atoms, d, of the workpiece. Reaction products, e, formed by the reaction dissolve into the ultrapure water, and are removed from the workpiece 2 by the flow of the ultrapure water along the surface of the workpiece 2. In this manner, removal processing of a surface layer of the workpiece 2 is carried out. Alternatively, an oxidation reaction between the workpiece atoms d and the hydroxide ions b forms a clean oxide film on the surface of the workpiece, thereby performing processing for oxide film formation. Accumulation of this film can obtain the desired shape.

According to the above-described method, hydroxide ions b are formed by the chemical reaction on the solid surface having ion exchange function or catalytic function that is installed in the vicinity of the surface of the workpiece. Thus, the surface of the workpiece close to the surface of the solid material that generates such hydroxide ions b is preferentially processed. Movement of this part that proceeds with processing enables the surface of the workpiece 2 to be processed into a desirable surface shape.

So-called transfer processing is also possible in which the shape of the ion exchange material 3 that generates hydroxide ions b is transferred to the surface of the workpiece. If the shape of the ion exchange material 3 that generates hydroxide ions b is linear, a plate-like material can be cut. By adjusting processing parameters, such as the supply amount of hydroxide ions b, moreover, it becomes possible to select whether the reaction induced on the surface of the workpiece 2 will be an oxidation reaction, or a removal processing reaction.

The present invention using such a catalytic material, and a conventional method using an ion exchange membrane will be compared and explained. With the conventional method, as shown in FIG. 2, hydrogen ions, c, can move into an ion exchange membrane 3a, but hydroxide ions b and water molecules minimally move into its interior. Thus, hydroxide ions b formed by electrolysis of water occur mainly on the surface of the ion exchange membrane 3a, and active points inside the ion exchange membrane remain unused. Hence, the efficiency of information of hydroxide ions b in the ion exchange membrane 3a was not sufficient, and an electric current flowing between the two electrodes was low. On the other hand, the present invention uses a water permeable catalytic material having some volume, such as a nonwoven fabric 3b given ion exchange ability. According to this invention, as shown in FIG. 3, water flows sufficiently into the nonwoven fabric 3b, so that active points inside the nonwoven fabric 3b can be utilized for electrolysis of water. In addition, the hydroxide ions b generated inside the nonwoven fabric can easily arrive at the workpiece as the anode as water moves. In the invention, therefore, a high currently density difficult to achieve by the conventional method can be obtained easily.

FIGS. 1 to 3 are concept views schematically showing a processing apparatus for realizing a processing method relying on hydroxide ions in ultrapure water according to the invention. This apparatus will be explained in further detail by reference to FIG. 4, but the invention is not restricted thereby.

In the electrolytic machining method as the first aspect of the invention, the catalytic material may be a nonwoven fabric provided with ion exchange ability. Such a nonwoven fabric is prepared by radiation-induced graft polymerization of a nonwoven fabric having a suitable fiber diameter and a void ratio, namely, a polymerization method which irradiates the nonwoven fabric with, for example, γ rays and then graft polymerizes the irradiated fabric. As the catalytic material, a cloth of ion exchange fibers, or a net having ion exchange groups introduced therein can be named. The ion exchange groups of the nonwoven fabric provided with ion exchange ability are desirably strongly basic anion exchange groups, or strongly acidic cation exchange groups.

As regards the gap between the nonwoven fabric and the cathode, or between the nonwoven fabric and the workpiece (anode), it is advantageous that the nonwoven fabric be in contact with both electrodes, because the value of the current can be increased. However, the reaction product tends to build up between the electrode and the nonwoven fabric, and processing may become nonuniform. Increasing the flow velocity of ultrapure water can resolve this possibility, but is not preferred, because an increase in a pressure loss of the apparatus is not avoidable. To remove the reaction product rapidly from the workpiece and the cathode, therefore, it is preferred to provide a gap between the nonwoven fabric and the electrode, especially the workpiece. The manner of providing the gap, and the size of the gap are selected according to the purpose of processing.

In the above electrolytic machining method, the catalytic material may be disposed in contact with one of the cathode and the anode, and away from the other.

In the above electrolytic machining method, the catalytic material may be disposed between the workpiece (anode) and the cathode so as to contact both of the workpiece and the cathode.

In the above electrolytic machining method, electrolytic machining may be performed, with ultrapure water being flowed in one direction between the workpiece and the cathode. According to this feature, the velocity of a flow of ultrapure water between the cathode and the workpiece, including the nonwoven fabric, is adjusted, whereby metal ions formed by the reaction can be removed or controlled reliably according to the purpose of processing or the characteristics of the workpiece.

A second aspect of the invention is an electrolytic machining apparatus, comprising a processing tank for holding ultrapure water, means for bearing a cathode and a workpiece in the processing tank, means for fixing a nonwoven fabric provided with ion exchange ability between the workpiece and the cathode, means for applying a voltage between the cathode and the workpiece, an ultrapure water feeder for supplying ultrapure water into the processing tank, and means for discharging waste water, which contains impurities formed by electrolytic machining, to the outside of the processing tank.

In accordance with the foregoing features of the invention, a flow of ultrapure water is formed inside a nonwoven fabric provided with ion exchange ability, whereby hydroxide ions are formed in much larger an amount than by a conventional ion exchange material such as an ion exchange membrane. The hydroxide ions can be supplied efficiently to the surface of a workpiece by an electric field and the flow of ultrapure water. Thus, the density of hydroxide ions near the surface of the workpiece is increased. Also, reaction products formed by the reaction between hydroxide ions and atoms of the workpiece are rapidly removed from the surface of the workpiece by the flow of ultrapure water. As a result, a fresh surface to be processed is always exposed, so that the processing speed becomes dramatically fast.

Furthermore, processing takes place by the electrochemical action of hydroxide ions and workpiece atoms. Thus, the workpiece is prevented from suffering physical defects and impaired characteristics. Besides, processing in ultrapure water can prevent contamination with impurities from the outside world, and can lead to the provision of a processed article having high quality. In addition, only ultrapure water is used, so that a burden on waste water disposal is very light, and a marked decrease in the processing cost is possible.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Preferred embodiments of the present invention will now be described in detail with reference to the accompanying drawings, which in no way limit the invention.

Figure 1:
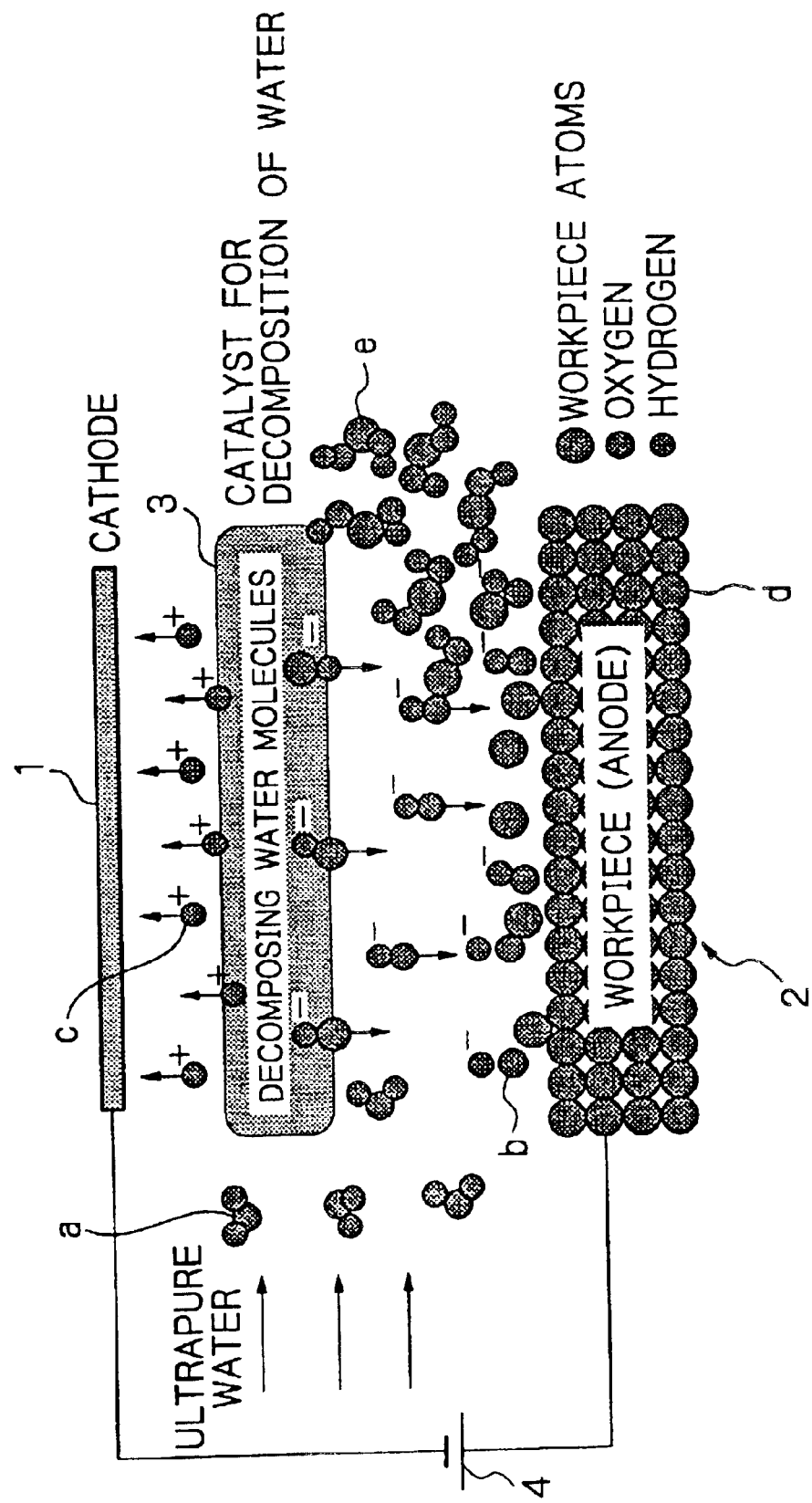
FIG. 1 is a concept view for illustrating the principle of electrolytic machining.
Figure 2:
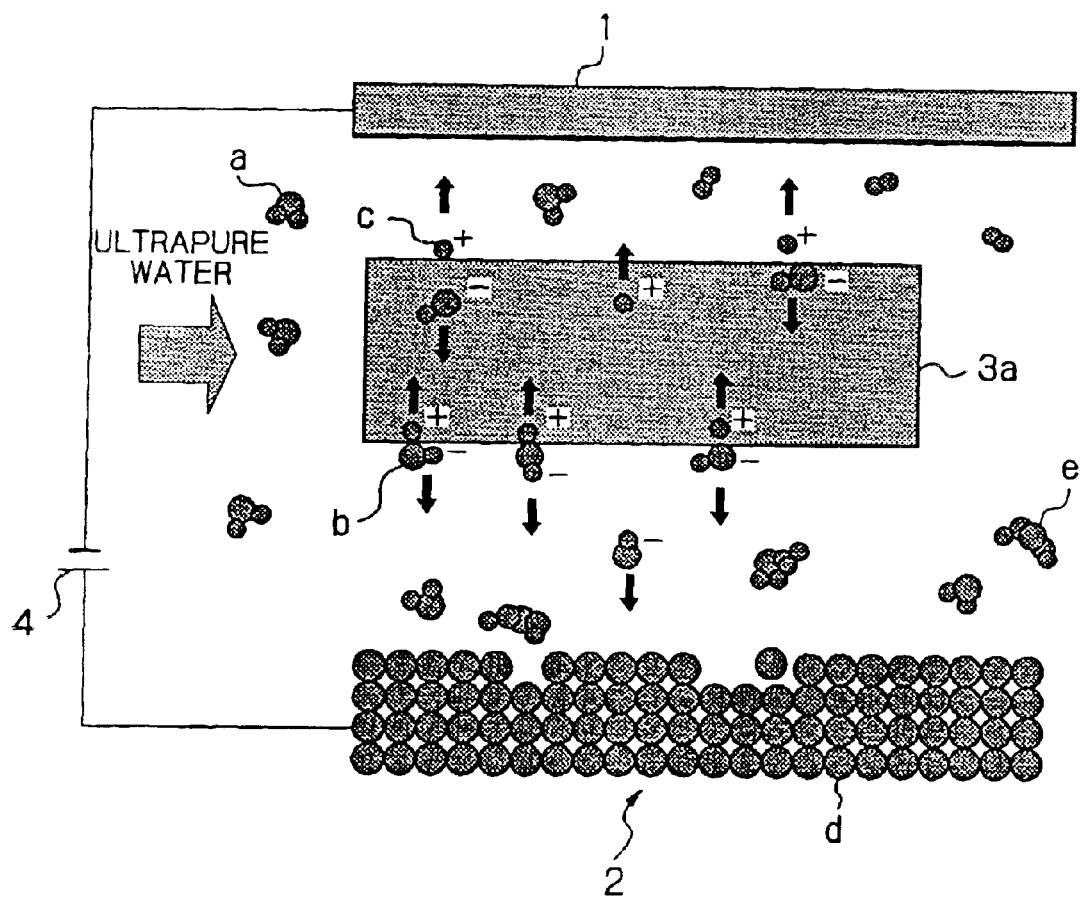
FIG. 2 is a concept view for illustrating the principle of processing according to a conventional method.
Figure 3:
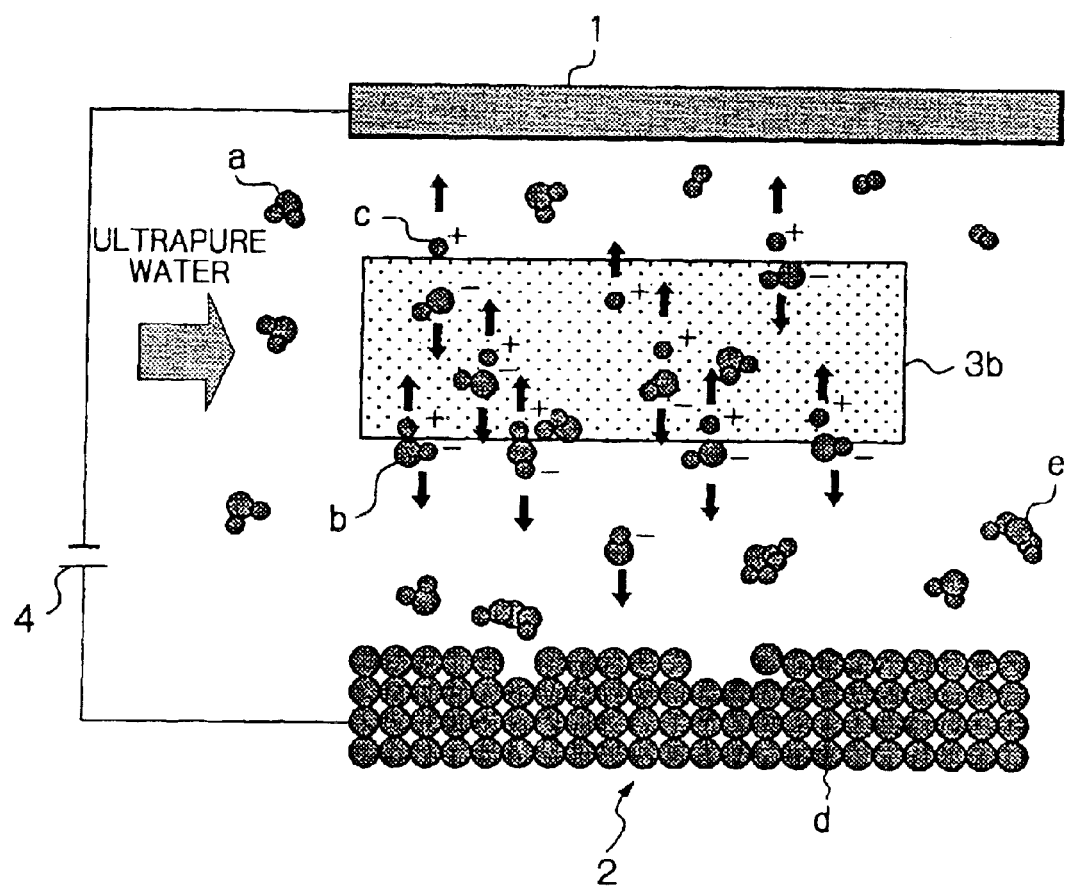
FIG. 3 is a concept view for illustrating the principle of processing according to the present invention in comparison with the conventional method.
Figure 4:
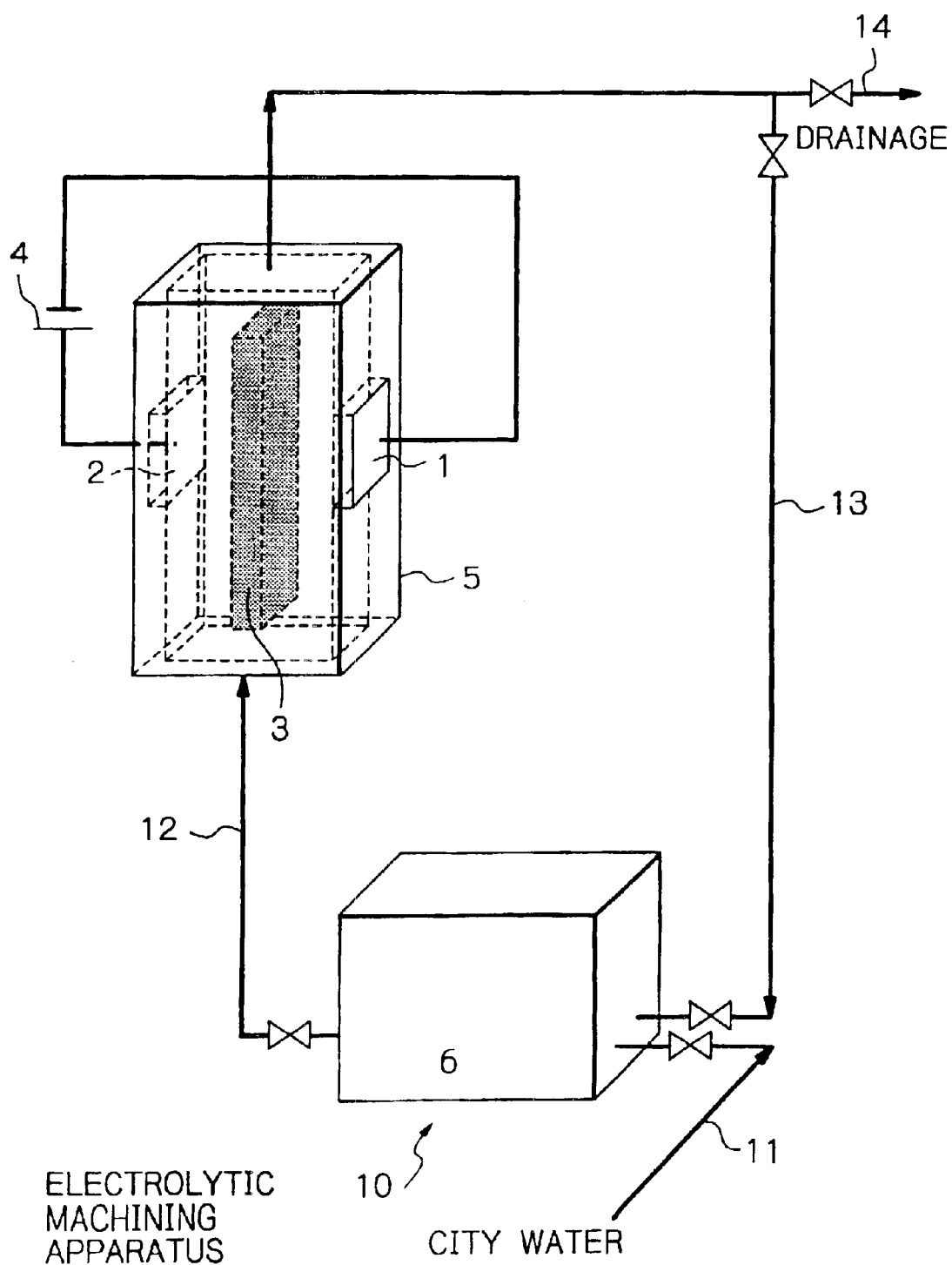
FIG. 4 is a sectional view of a first embodiment of an electrolytic machining apparatus according to the invention.

As shown in FIG. 4, an electrolytic machining apparatus 10 comprises a sealable processing tank 5, an ultrapure water feeder 6 for accepting city water, for example, from an inlet piping 11 and using this water as raw water to produce ultrapure water, a supply piping 12 for supplying ultrapure water from the ultrapure water feeder 6 to the processing tank 5, a return piping 13 for returning outlet water from the processing tank 5 to the ultrapure water feeder 6, and a drainage pipe 14 for discharging part of the outlet water from the processing tank 5 to the outside of the system. Inside the processing tank 5, a cathode 1, and a workpiece 2, which is an anode opposed to the cathode 1, are supported by a predetermined support structure. Between the cathode 1 and the workpiece 2, a nonwoven fabric (catalytic material) 3, which is an ion exchange material provided with ion exchange ability, is disposed in such a manner as to divide the processing tank 5. According to the purpose of processing and the characteristics of the workpiece 2, the nonwoven fabric 3 is provided in contact with both of the cathode 1 and the workpiece 2, or in close contact with the workpiece 2 alone, or in close contact with the cathode 1 alone.

In the above-described apparatus, ultrapure water is circulated from the ultrapure water feeder 6 to the processing tank 5 and the return piping 13 via the supply piping 12. At the same time, a power source 4 is connected to the cathode 1 and the workpiece 2 as the anode, and a voltage is applied between both electrodes. As a result, hydroxide ions are formed by a chemical reaction on the solid surface of the nonwoven fabric 3 provided with ion exchange ability. These hydroxide ions perform removal processing or oxide film formation. Consequently, an upward flow is formed inside the processing tank 5, and passes through the nonwoven fabric 3. Thus, hydroxide ions are produced in large amounts, and fed to the surface of the workpiece 2 to effect efficient processing.

Water discharged from the processing tank 5 is returned to the ultrapure water feeder 6 via the return piping 13, if this water is cleaner than city water. If the discharged water is relatively dirty, it is discharged to the outside by the drainage pipe 14 so that ultrapure water supplied can always maintain high purity. If a rise in the water temperature due to circulation is likely, a heat exchanger is disposed in the circulation system to remove heat by cooling water and control the water temperature during processing to be as constant as possible. This is necessary to increase the processing accuracy. The invention does not use a chemical other than ultrapure water. Thus, contamination inside the processing tank 5 is only a reaction product occurring during the processing procedure. Even if the circulation is performed, the amount of load on the ultrapure water feeder 6 is very small. Because of the circulation, the amount of drainage is decreased, and treatment of a chemical solution is also unnecessary. Hence, the operating cost can be minimized.

Figure 5:
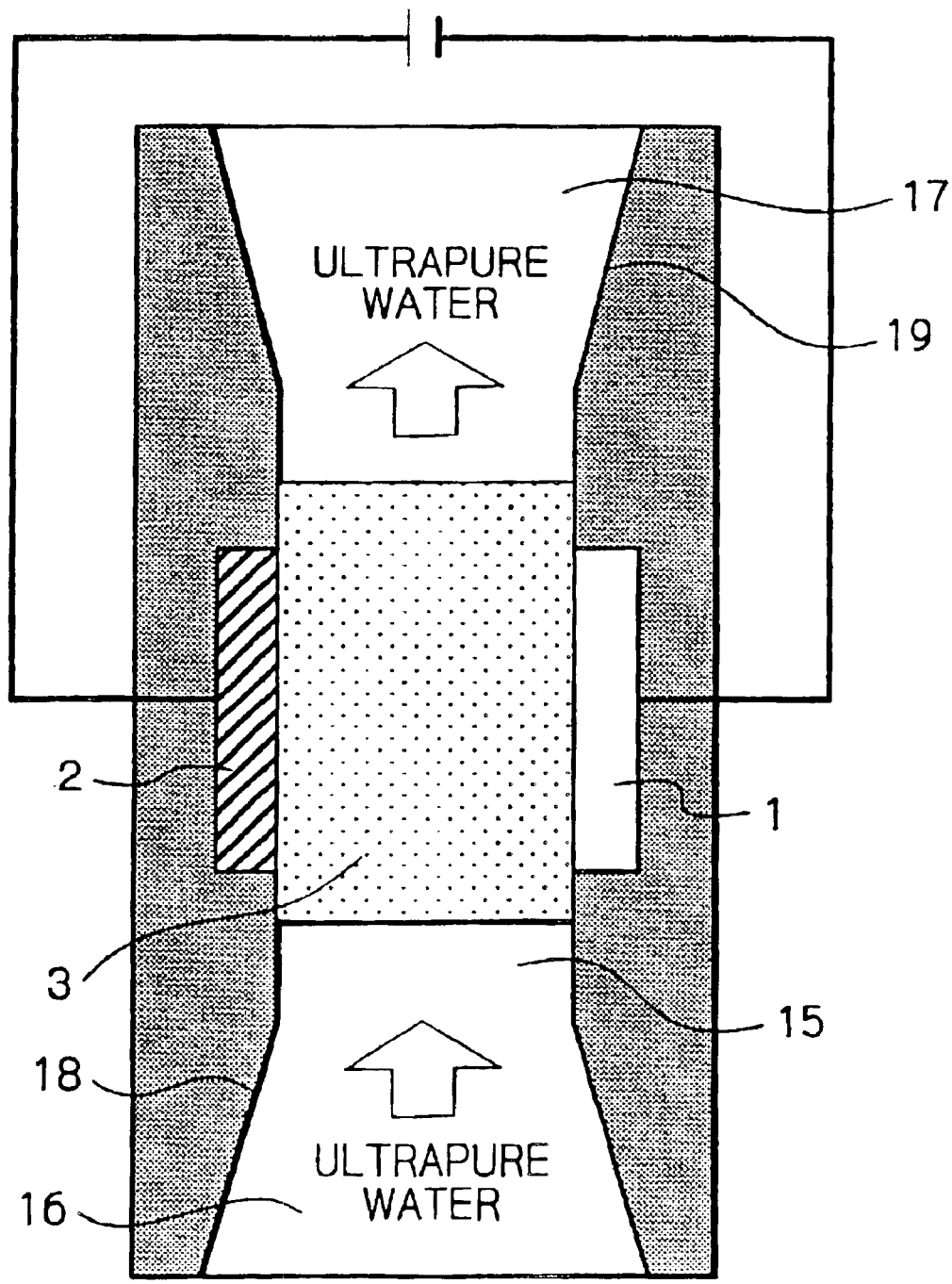
FIG. 5 is a sectional view of another embodiment of an electrolytic machining apparatus according to the invention for the purpose of experiments.

FIG. 5 shows another embodiment of the electrolytic machining apparatus according to the invention. In this embodiment, a cathode 1 and a workpiece 2 are disposed opposite to each other on both walls of a channel 15 for ultrapure water. Between the cathode 1 and the workpiece 2, a nonwoven fabric 3 provided with ion exchange ability is disposed in such a manner as to block the channel. The channel is formed as a narrow portion of a predetermined length which is defined between an upstream broad portion 16 and a downstream broad portion 17 via tapered channel enlarging portions (shrinking portions) 18 and 19. At sites opposed to the center of the narrow portion, depressions are formed for holding the cathode 1 and the workpiece 2. Between these depressions, a holder mechanism is provided for holding the nonwoven fabric. The presence or absence of the gap between the nonwoven fabric 3, cathode 1 and workpiece 2, and the size of the gap, if any, may be determined according to the purpose of processing and the characteristics of the workpiece 2. In the absence of the gap, ultrapure water flows only through the nonwoven fabric 3. In the presence of the gap, ultrapure water flows dividedly according to the size of the gap. According to the present embodiment, the cathode 1, the workpiece 2 and the nonwoven fabric 3 are disposed in the closed channel, so that the flow of ultrapure water among these members can be controlled completely. That is, the flow is unidirectional, and does not stagnate or return. Nor does the flow escape by any other route. Thus, its velocity can be adjusted merely by the opening of a flow control valve. Hence, the flow velocity is set according to the purpose of processing and the characteristics of the workpiece 2, whereby metal ions, etc. produced by the reaction can be removed or controlled reliably.

EXAMPLES

Example 1

The apparatus shown in FIG. 5 was used for experiments. Ultrapure water was supplied at a flow rate of 300 ml/min, and the nonwoven fabric 3 provided with strongly acidic cation exchange ability was disposed between both electrodes 1 and 2. The electrodes 1 and 2 were both made of platinum. Using these members, the relation between a voltage applied and a current density was investigated. The distance between the electrodes was 0.8 mm, and the nonwoven fabric 3 provided with strongly acidic cation exchange ability was disposed in contact with both electrodes. The nonwoven fabric 3 provided with strongly acidic cation exchange ability was prepared by radiation-induced graft polymerization of a nonwoven polyolefin fabric having a fiber diameter of 20 to 50 $\mu$m and a void ratio of about 90%, namely, a polymerization method which irradiated the nonwoven fabric with $\gamma$ rays and then graft polymerized the irradiated fabric. Further, the incorporated graft chains were sulfonated to introduce sulfonic groups. The ion exchange capacity of the resulting nonwoven fabric was 2.8 meq/g.

Figure 6:
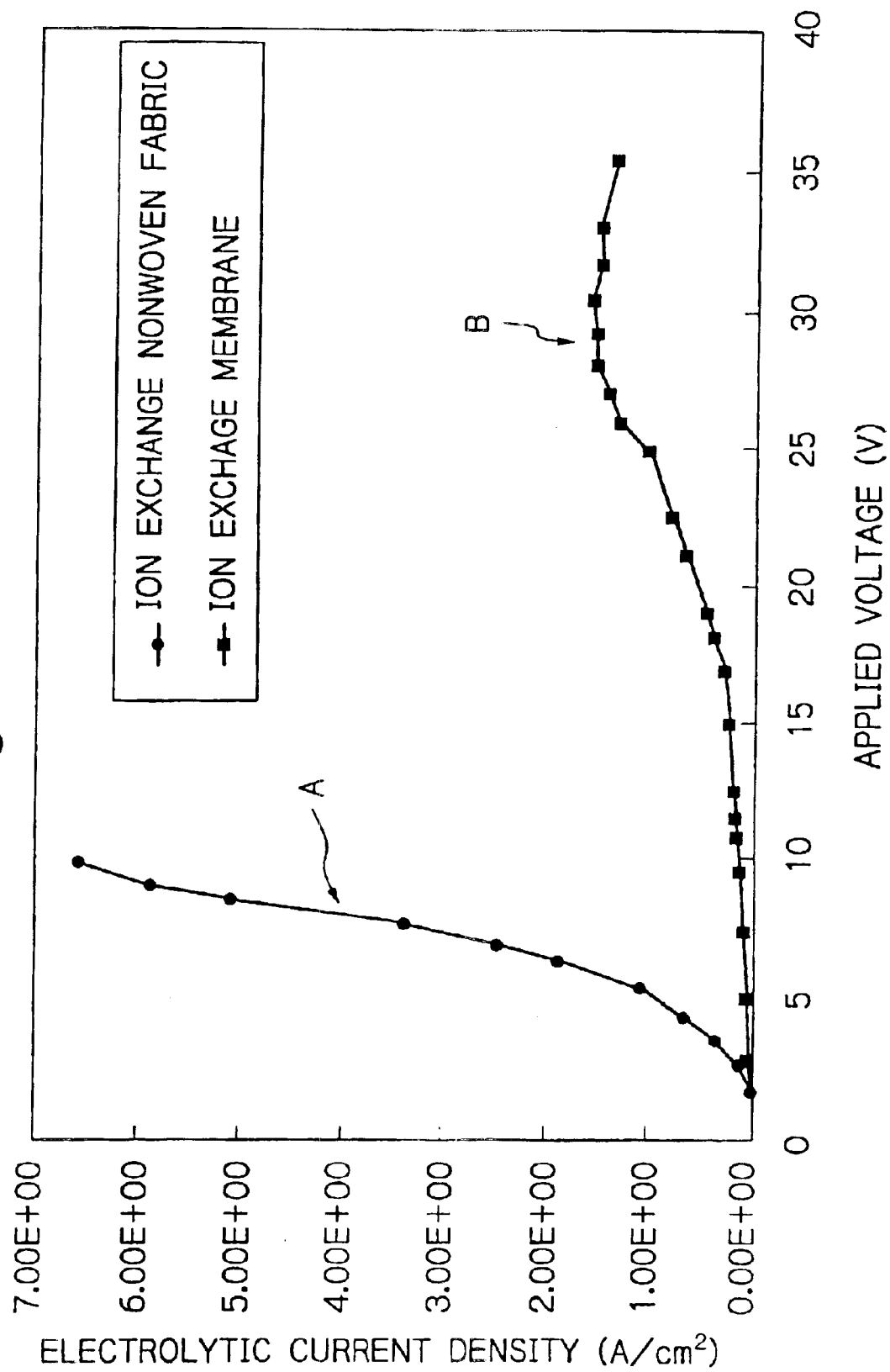
FIG. 6 is a graph showing the relation between a voltage applied and an electrolytic current density based on the results of Example 1 that used the apparatus of FIG. 5.

The relation between the applied voltage and the current density is shown in FIG. 6. As curve A in FIG. 6 shows, when the applied voltage was 9.7 V, the current density was 6.6 A/cm$^2$. As shown here, when the nonwoven fabric 3 provided with strongly acidic cation exchange ability was installed between the electrodes, an electric current flowed efficiently between the electrodes. Thus, it was confirmed that a high current could be obtained even at a low voltage applied.

As stated above, with the use of the nonwoven fabric 3 provided with ion exchange ability, water can move freely inside the nonwoven fabric. Thus, water can easily arrive at active points inside the nonwoven fabric which have the action of catalyzing the decomposition of water. As a result, many water molecules are decomposed into hydrogen ions and hydroxide ions. Further, the hydroxide ions generated by electrolysis are transported efficiently to the surface of the electrode as water moves. Hence, a high current is obtained at a low voltage applied.

Comparative Example 1

The same experiments as in Example 1 were conducted by means of the apparatus shown in FIG. 5 and with the use of a strongly acidic cation exchange membrane (Nafion 117, Du Pont) as a conventional method, instead of the nonwoven fabric provided with strongly acidic cation exchange ability. The results are indicated as B in FIG. 6. To make the thickness of the Nafion membrane member equal to the thickness of the nonwoven fabric provided with strongly acidic cation exchange ability, five Nafion membranes were stacked and used as the Nafion membrane member. The results offered by the curve B in FIG. 6 showed that at an applied voltage of about 10 V. a current flowing between the electrodes was about 0.1 A/cm$^2$, 1/66 of the value obtained by use of the nonwoven fabric with strongly acidic cation exchange ability in Example 1. Even at an applied voltage of about 30 V or more, a current flowing between the electrodes was about 1.5 A/cm$^2$, by far smaller a value than the results of Example 1.

These results demonstrate the following facts: With the conventionally used ion exchange membrane, there is no movement of water into the ion exchange membrane. Thus, water molecules minimally arrive at active points having the action of catalyzing the decomposition of water. Most of water decomposition takes place on the surface of the membrane, and water molecules decomposed into ions are in smaller amounts than by the use of the nonwoven fabric which can decompose water even in its interior. Accordingly, it was confirmed that the method of the invention, which uses a nonwoven fabric having a structure facilitating movement of water and provided with ion exchange ability, can easily achieve, at a low voltage, a much larger current than by the conventional method using an ion exchange membrane.

Example 2

Figure 7:
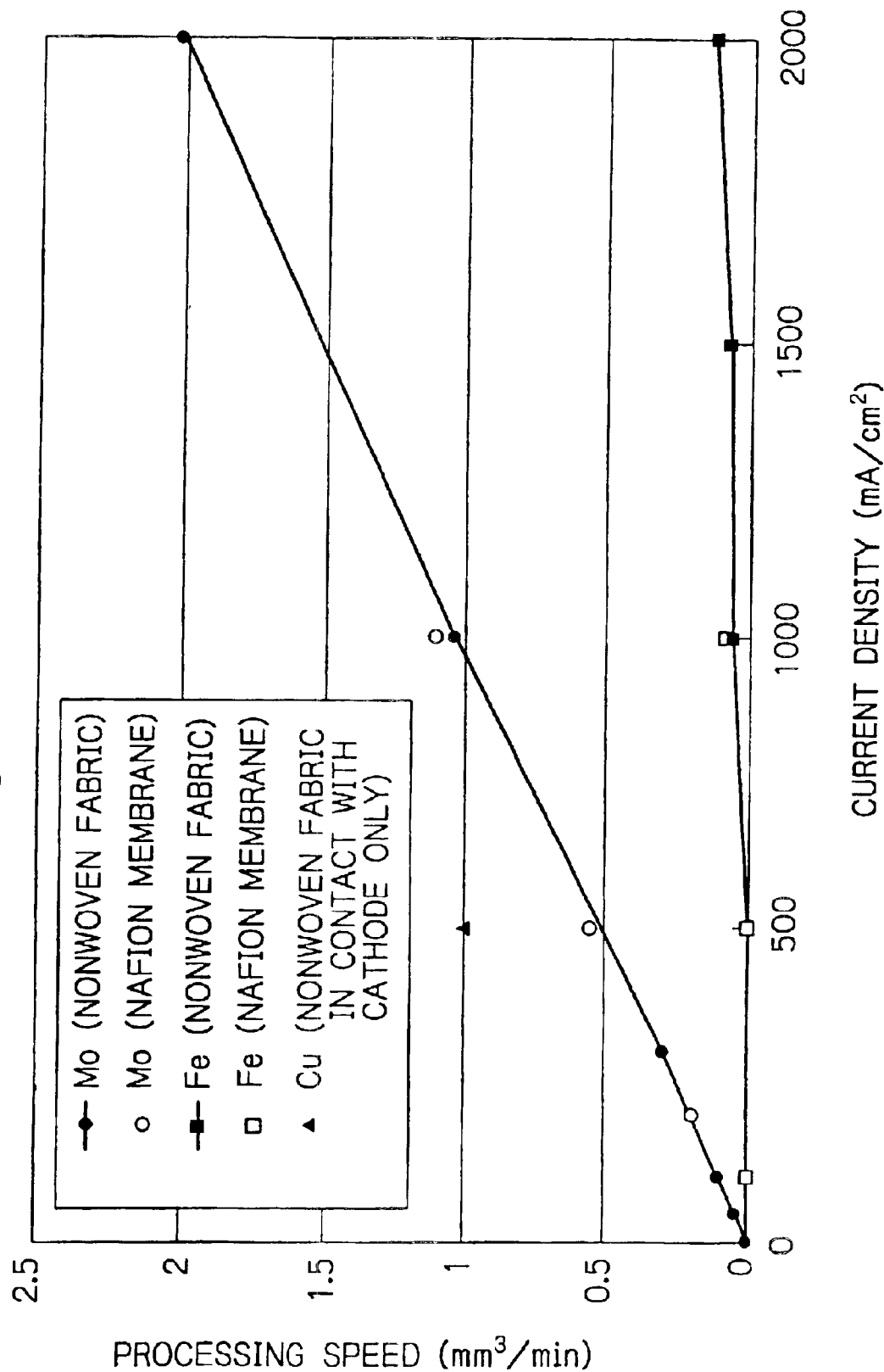
FIG. 7 is a graph showing the relation between a current density and a processing speed based on the results of Examples 2 and 3 that used the apparatus of FIG. 5.

An attempt at electrolytic removal processing was made by means of the same apparatus as in Example 1 and using platinum as the cathode 1 and Mo or Fe as the workpiece 2 (anode), with the nonwoven fabric 3 given strongly acidic cation exchange ability being fixed between the electrodes. The results are shown in FIG. 7.

The processing speed was proportional to the current density for each of Mo and Fe, and a nearly linear relation was seen between these parameters. These findings confirmed that removal processing can be performed by moving hydroxide ions generated by decomposition of water onto the surface of the workpiece 2 and reacting the hydroxide ions with the workpiece 2, and that the processing speed is determined by the amount of hydroxide ions moved to the surface of the workpiece 2, and is governed by the magnitude of the current density.

Comparative Example 2

The same experiments as in Example 2 were conducted using a strongly acidic cation exchange membrane (Nafion) instead of the nonwoven fabric provided with strongly acidic cation exchange ability. To make the thickness of the Nafion membrane member equal to the thickness of the nonwoven fabric, five Nafion membranes were stacked and used as the Nafion membrane member. The results are shown in FIG. 7. FIG. 7 confirmed the following facts: With the Nafion membrane which is an ion exchange membrane, the results are comparable to the results obtained when the nonwoven fabric given cation exchange ability was used. The processing speed is unrelated to the type of the ion exchanger for promoting dissociation of water, and depends on the current density, i.e., the amount of hydroxide ions moved to the surface of the workpiece 2.

It is of utmost practical importance that a high current density is obtained at a low applied voltage. The method of the invention, which uses a nonwoven fabric provided with ion exchange ability, can easily obtain a current density several times to several tens of times as high as that of the conventional ion exchange membrane. Thus, the superiority of the invention was demonstrated.

Example 3

Figure 8:
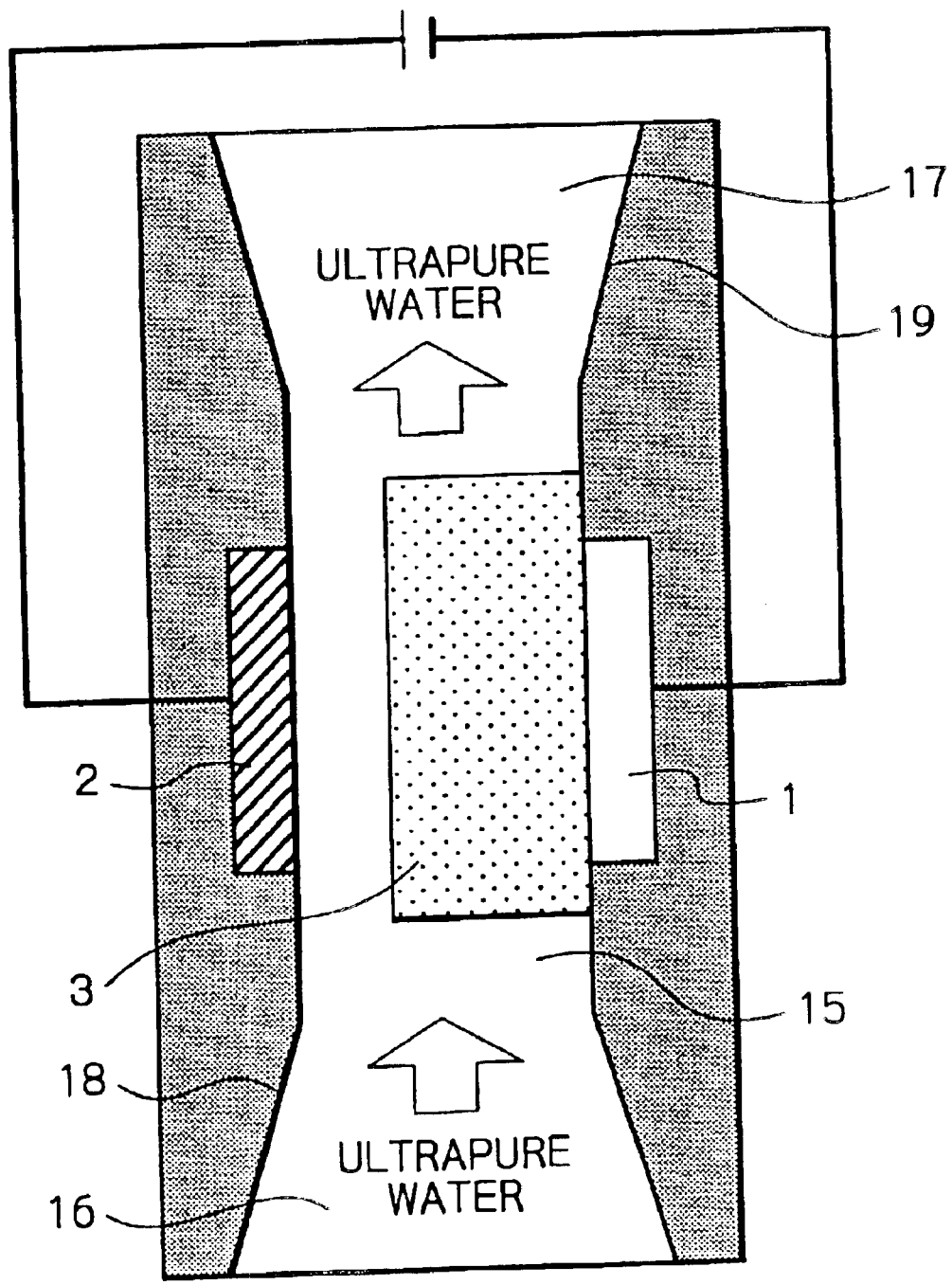
FIG. 8 is a view showing the process of Example 3 that used the apparatus of FIG. 5.

As shown in FIG. 8, removal processing of Cu was performed, with the nonwoven fabric given strongly acidic cation exchange ability being in contact with the cathode, but away from the anode (Cu) by a distance of 60 $\mu$m. When the removal processing was carried out for 2 minutes at a current density of 0.5 A/cm$^2$, a volume processing speed of 1.0 mm$^3$/min or a processing speed in the depth direction of 10 $\mu$m/min was obtained, as shown in FIG. 7. This processing speed corresponds to a current efficiency of 91%, on the assumption that Cu is being processed as divalent ions.

Comparative Example 3

Removal processing of Cu was performed, with the same strongly acidic cation exchange ability-imparted nonwoven fabric as used in Example 3 being in contact with both of the anode and the cathode. When the removal processing was carried out for 2 minutes at a current density of 0.5 A/cm$^2$, a volume processing speed of 0.16 mm$^3$/min or a processing speed in the depth direction of 1.6 $\mu$m/min was obtained. This processing speed is less than 1/6 of that obtained when the anode (Cu) is kept out of contact with the nonwoven fabric as in Example 3. The current density calculated on the assumption that Cu is divalent ions is also as low as 14%. The causes may be as follows: The voltage for keeping the current density constant begins to fall rapidly several tens of seconds after start of processing, and a black substance is accumulated in the nonwoven fabric after processing. These phenomena suggest that the processing product and the product on the cathode build up in the nonwoven fabric, thereby short-circuiting the anode and the cathode. This comparative example demonstrates that when processing Cu, the anode and the nonwoven fabric should be kept out of contact and the processing product should be removed; these measures are effective for continued processing.

While the present invention has been described in the foregoing fashion, it is to be understood that the description merely shows preferred embodiments of the invention, and various changes and modifications may be made without departing from the spirit and scope of the invention.

The entire disclosure of Japanese Patent Application No. 241869/1999 filed on Aug. 27, 1999 including specification, claims, drawings and summary is incorporated herein by reference in its entirety.

What is claimed is:

1. A method for electrolytic removal processing, comprising:
   placing an electrode;
   placing a workpiece to be processed so that the workpiece is disposed opposite the electrode;
   providing a water permeable material having some volume between the workpiece and said electrode; and
   supplying liquid to said water permeable material while causing an electric field to exist between the workpiece and the electrode, thereby performing removal processing from the workpiece, wherein said liquid is circulated and reused as a feed liquid.

2. A method according to claim 1, further comprising controlling a temperature of said liquid during said circulation.

3. A method according to claim 1, further comprising discharging a part of said liquid outside.

4. A method according to claim 1, wherein said water permeable material comprises a catalytic material.

5. A method according to claim 4, wherein said catalytic material has an activity to promote dissociation of said liquid.

6. A method according to claim 1, wherein said water permeable material comprises an ion exchange material.

7. A method according to claim 1, wherein said liquid comprises water.

8. A method according to claim 7, wherein said water comprises ultrapure water.

9. A method according to claim 1, wherein said electrode comprises a cathode.

10. An apparatus for electrolytic removal processing, comprising:
    an electrode opposed to a workpiece to be processed;
    a power source for applying a voltage between said electrode and the workpiece;
    liquid supply piping for supplying a liquid between said electrode and the workpiece;
    a water permeable material provided between said electrode and the workpiece; and
    return piping for circulating the liquid for removal processing to said liquid supply piping as a feed liquid.

11. An apparatus according to claim 10, further comprising a heat exchanger for controlling a temperature of the liquid during processing.

12. An apparatus according to claim 10, further comprising a drainage pipe for discharging part of the liquid to outside.

13. An apparatus according to claim 10, wherein said water permeable material comprises a catalytic material.

14. An apparatus according to claim 13, wherein said catalytic material has an activity to promote dissociation of the liquid.

15. An apparatus according to claim 10, wherein said water permeable material comprises an ion exchange material.

16. An apparatus according to claim 10, wherein said liquid supply piping is operable to supply water as the liquid.

17. An apparatus according to claim 16, wherein said liquid supply piping is operable to supply ultrapure water as the liquid.

18. An apparatus according to claim 10, wherein said electrode comprises a cathode.

19. A method for electrolytic removal processing, comprising:
    placing an electrode;
    placing a workpiece to be processed so that the workpiece is disposed opposite the electrode;
    placing a water permeable material having some volume between said electrode and the workpiece and contacting said water permeable material with the workpiece during said removal processing; and
    supplying a liquid between said electrode and the workpiece while causing an electric field to exist between the workpiece and the electrode, thereby performing removal processing from the workpiece.

20. A method according to claim 19, wherein said water permeable material comprises a nonwoven fabric.

21. A method according to claim 19, wherein said water permeable material has ion exchange ability.

22. An apparatus for electrolytic removal processing, comprising:
    an electrode opposed to a workpiece to be processed;
    a water permeable material having some volume provided between said electrode and the workpiece such that said water permeable material contacts with the workpiece during removal processing;
    a power source for applying a voltage between said electrode and the workpiece; and
    a liquid supply for supplying a liquid between said electrode and the workpiece.

23. An apparatus according to claim 22, wherein said water permeable material comprises a nonwoven fabric.

24. An apparatus according to claim 22, wherein said water permeable material has ion exchange ability.

25. An apparatus according to claim 22, wherein said liquid supply is operable to supply water as the liquid.

26. An apparatus according to claim 25, wherein said liquid supply is operable to supply ultrapure water as the liquid.

27. An apparatus according to claim 22, wherein said electrode comprises a cathode.

28. A method for electrolytic removal processing, comprising:

placing an electrode;

placing a workpiece to be processed so that the workpiece is disposed opposite the electrode; and supplying liquid between said electrode and the workpiece;

providing a contact material between said electrode and the workpiece such that said material contacts with the workpiece during said processing; and providing an electric field between the workpiece and the electrode, thereby performing said removal processing by increasing hydroxide ions near said surface of the workpiece by said electric field.

29. A method according to claim 28, wherein said hydroxide ions are derived by ion exchange material disposed between the workpiece and the electrode.

30. A method according to claim 28, wherein said hydroxide ions are increased near the workpiece assisted by a flow of said liquid.

31. A method for electrolytic machining, comprising:

placing an electrode;

placing a workpiece to be machined so that the workpiece is disposed opposite the electrode;

providing a water permeable material between the workpiece and the electrode, supplying liquid between said electrode and the workpiece while causing an electric field to exist between the workpiece and the electrode, thereby performing machining of the workpiece; and controlling a temperature of said liquid during said machining process.

32. A method according to claim 31, wherein said controlling of the temperature is conducted by a heat exchanger.

33. A method according to claim 31, wherein said controlling of the temperature is conducted by removing heat by cooling water.

34. A method according to claim 31, wherein said temperature of said liquid is controlled to be maintained constant.

35. A method according to claim 31, wherein said liquid is circulated and reused.

36. An apparatus for electrolytic machining, comprising:

an electrode opposed to a workpiece to be machined;

a power source for applying a voltage between said electrode and the workpiece;

a liquid supply for supplying a liquid between said electrode and the workpiece;

a water permeable material provided between said electrode and the workpiece; and a temperature control system for controlling a temperature of the liquid during the machining.

37. An apparatus according to claim 36, wherein said temperature control system comprises a heat exchanger.

38. An apparatus according to claim 36, wherein said temperature control system cools the liquid.

39. An apparatus according to claim 36, wherein said temperature control system is operable to control the temperature of the liquid so that the temperature is maintained constant.

40. An apparatus according to claim 36, wherein the liquid is circulated and reused.

41. A method for electrolytic removal processing, comprising:

placing an electrode;

placing a workpiece to be processed so that the workpiece is disposed opposite the electrode;

providing a contact material between said electrode and the workpiece such that said material contacts with the workpiece during the processing;

supplying a liquid between said electrode and the workpiece while causing an electric field to exist between the workpiece and the electrode, thereby performing removal processing from the workpiece; and causing a flow of said liquid near the workpiece during the processing.

42. A method according to claim 41, wherein said liquid is circulated during said removal processing.

* * * * *